Figure 1:
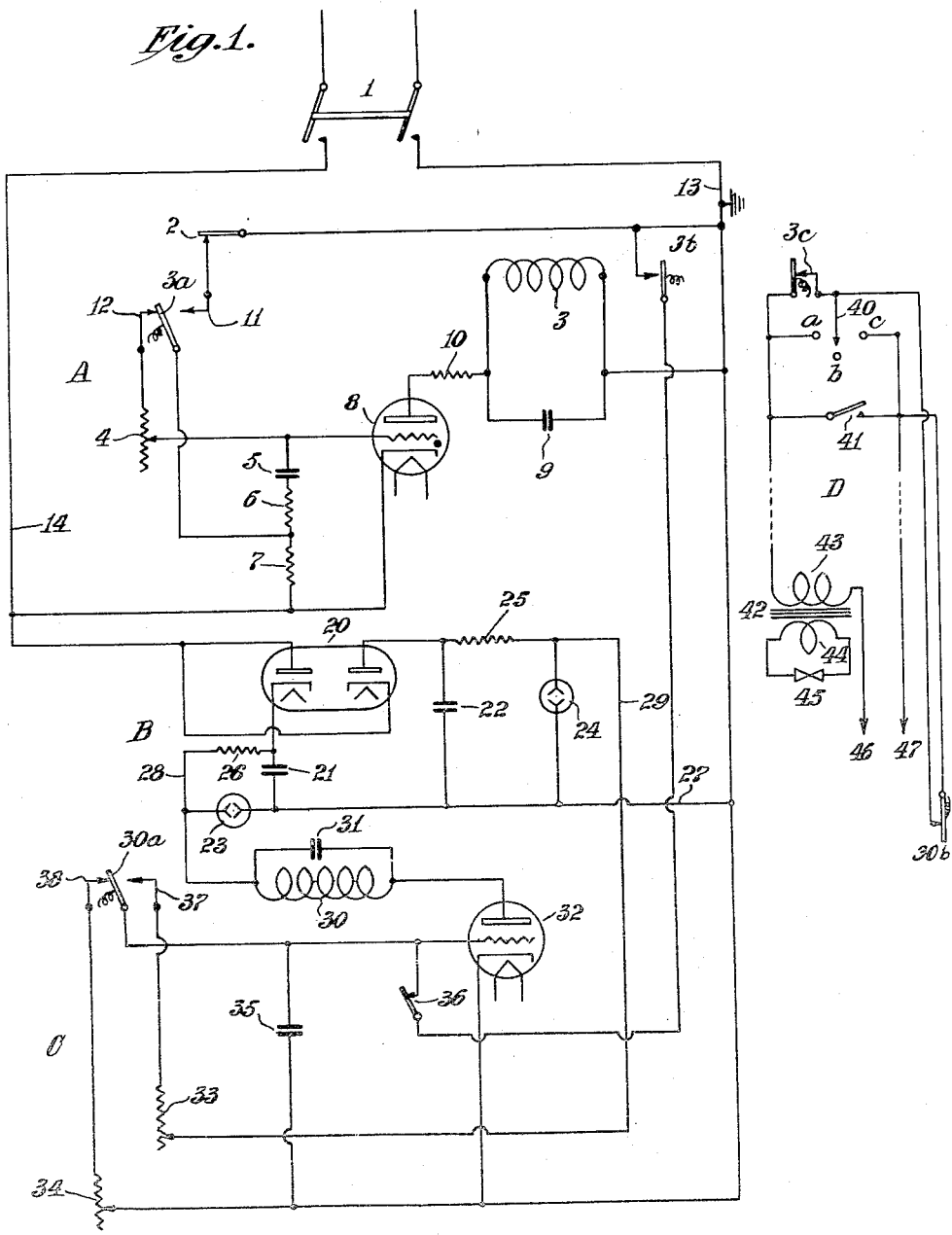

Nov. 7, 1950  J. KURTZ ET AL  2,528,835
WELD TIMER
Filed Feb. 8, 1944  3 Sheets-Sheet 2
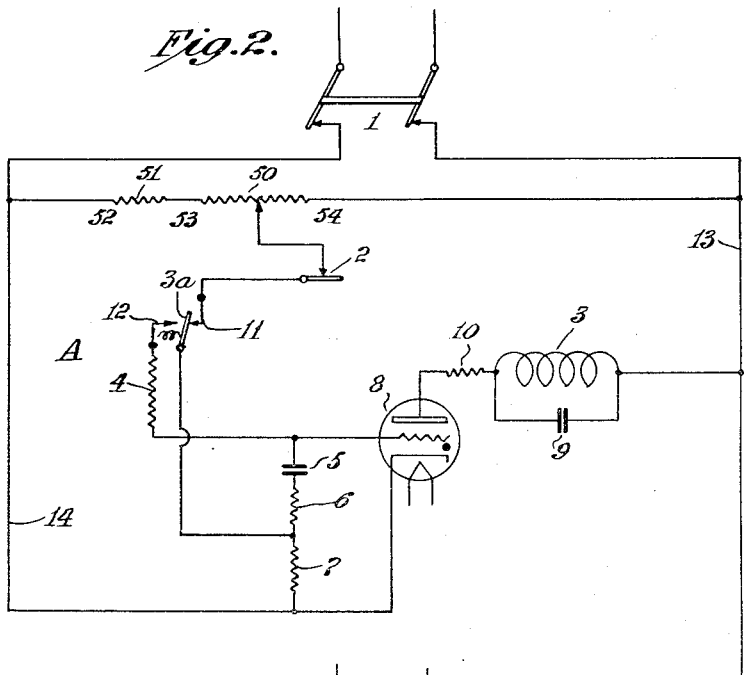
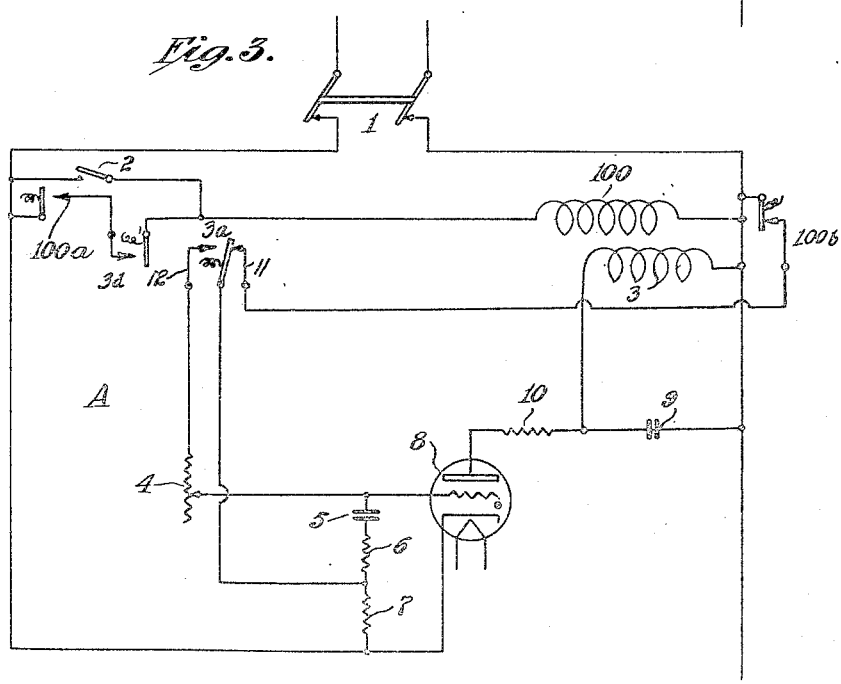
INVENTORS
Jacob Kurtz
James D. Waldie

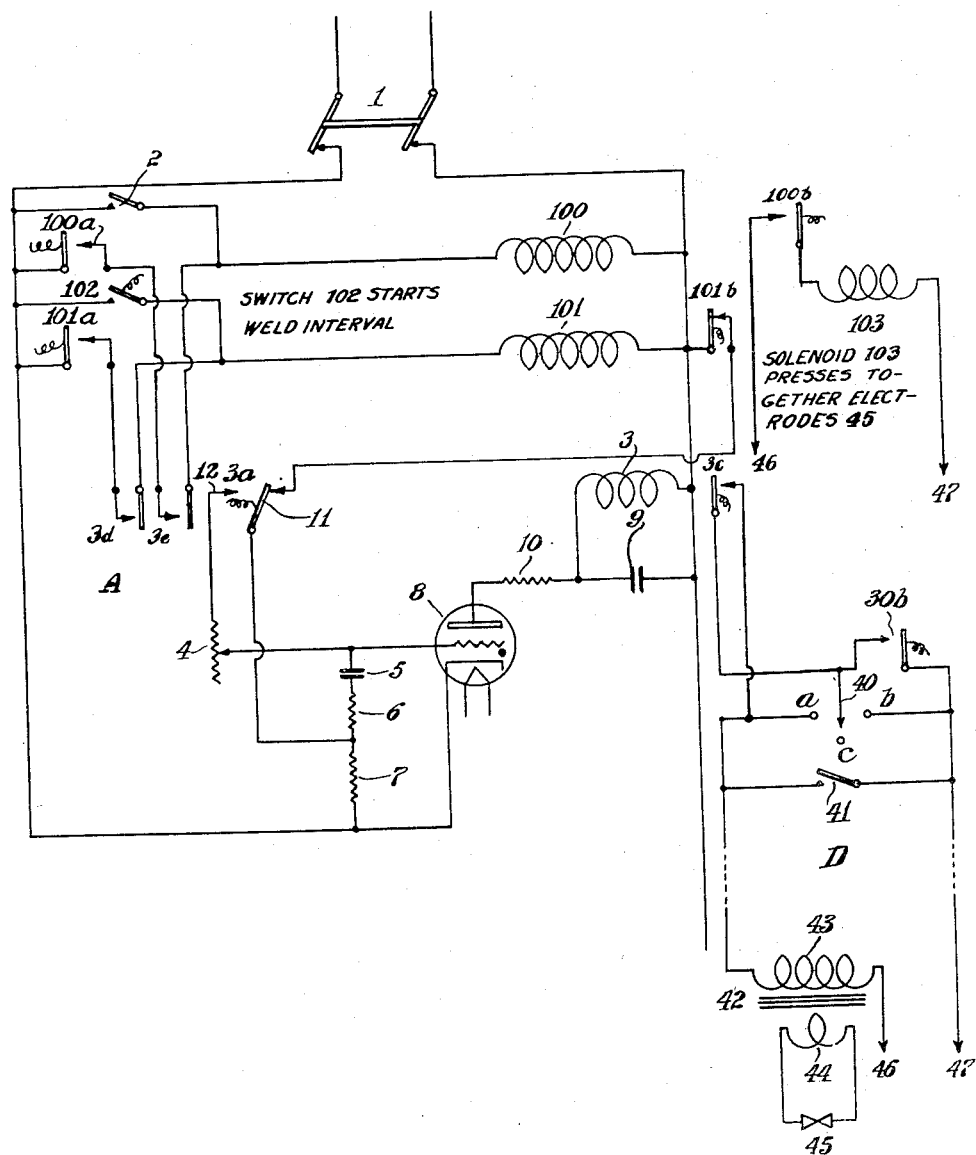

Patented Nov. 7, 1950

2,528,835

UNITED STATES PATENT OFFICE 2,528,835

WELD TIMER

Jacob Kurtz, Teaneck, N. J., and James D. Waldie, New York, N. Y., assignors, by mesne assignments, to Sylvania Electric Products, Inc., a corporation of Massachusetts Application February 8, 1944, Serial No. 521,590

11 Claims. (Cl. 175—320)

This invention relates to new and useful improvements in timing circuits and more particularly in sequence and pulsation timers.

The principal object of the invention is to reduce the number of component parts of a timing circuit, thus simplifying its operation and reducing the cumulative timing error that may be caused by a multiplicity of relays or the like without sacrifice to adjustability or adaptability.

The customary welding sequence timer provides for a series of heat and cool periods in a welding interval by causing the welding current to flow in a series of suitably spaced pulses. All the heat periods are of equal and adjustable lengths, as are all the cool periods, though usually different from the heat periods.

Sequence timers are used, for instance, to control a series of more or less closely spaced spot welds for joining two sheets of metal. Pulsation timers may be employed to produce repeated surges of welding current at one spot.

Pulsation and sequence timers used for other purposes than welding have suitably varied features but operate on the same principle.

The various features of the invention will now be explained in connection with the drawings in which Fig. 1 diagrammatically illustrates one embodiment of the invention, and Figs. 2–4 modifications of Fig. 1.

Referring first to the four large divisions of Fig. 1, section A controls the weld interval time and section C the heat and cool periods. Sections A and C jointly control circuit D which produces the timed heat and cool intervals required in the welding circuit. Section B supplies regulated direct current voltages to section C.

The timer operates from 115 volt, 60 cycle power mains; for other supply voltages a suitable transformer must be inserted between the power mains and the input terminals to the timer.

In Fig. 1, switch 1 serves as a power switch and switch 2 initiates a warming up period for the tubes and switch 2 initiates the timing operations proper. The contacts of switch 2 are normally closed and it may be located on the welder or other apparatus controlled by the timer unit. As shown in Figs. 3 and 4, the switch contacts may be normally closed contacts of a control relay operating on the power supply voltage.

A direct current relay coil 3 is adapted to be energized by the current supplied by a gas-filled triode 8 (types 884, 885 or the like) over a suitable resistance 10. The contacts of relay 3 are designated by that number followed by a letter. 3a are movable single pole, double throw contacts which engage stationary contact 11 when the relay 3 is energized, and stationary contact 12 when the relay is de-energized. 3b are normally open single pole, single throw contacts, and 3c are normally closed single pole, single throw contacts.

The position of variable resistor 4 determines the time interval of the A section.

A low resistance 6 is provided to reduce arcing of contacts 3a and to fix the minimum time interval for section A.

A resistor 7 of approximately 50,000 ohms, 10 watt rating serves to prevent arcing between cathode and grid.

A condenser 9 of approximately 1 micro-farad capacitance is provided to eliminate relay chatter. Without this condenser the relay would carry current only during alternate half-cycles.

Tube 20 is a full-wave rectifier tube of types 25Z5, 25Z6, 117Z6–GT/G, or the like. Condensers 21 and 22 are filter condensers, at least 8 microfarads, 250 volt rating. Tubes 23 and 24 are voltage regulators and are of types VR105–30, VR150–30, or the like. Resistors 25 and 26 limit the current taken by voltage regulator tubes 23 and 24.

The rectifier section B is grounded over conductor 27. Positive voltage lead 28 applies approximately 150 volts above ground potential and negative voltage lead 29 approximately 105 volts below ground potential.

Relay 30 is a relay like 3, and has similar contacts. Contact 30b is a single pole, single throw contact, normally open. Condenser 31 is a condenser corresponding to condenser 9.

Tube 32 is a high vacuum triode controlling energization of relay 3.

Variable resistors 33 and 34, in combination with timing condenser 35, determine the length of the heat and cool periods of the sequence timer C.

Switch 36 is a single pole, single throw switch, switch 40 a single pole, three-position switch, and switch 41, a single pole, single throw switch permitting the adjustment of the timer for various customary welding procedures.

Transformer 42 is a welder transformer having a primary 43 and a secondary 44. Lines 46 and 47 are the current supply lines.

The work to be welded is between the electrodes 45.

In addition to elements of Fig. 1, which are identified by the same reference numerals, the circuit of Fig. 2 has a linear taper potentiometer 50, and a resistor 51 of fixed value. In Figs. 3 and 4, 100 and 101 are alternating current relays. In Fig. 4, 102 is a pressure controlled switch and 103, a solenoid controlling the electrode pressure.

The operation of the device as a sequence timer will now be described in connection with Fig. 1. Switch 36 of section C must be closed, switch 41 of section D must be open, and switch 40 must be in neutral position C.

When the power switch 1 is closed, the heaters of tubes 8, 20 and 32 begin to heat up. The grid of tube 8 being at cathode potential, the tube fires and allows current to flow through relay 3. Condenser 9 will be charged during those half-cycles of the power line frequency when the anode of tube 8 is positive. During the half-cycles when the anode is negative, no current flows through the tube, and the condenser 9 discharges through relay 3.

Upon its energization, relay 3 pulls contact 3a over to contact 11, completing a series circuit from one blade of the power line switch 1, conductor 13, normally closed switch contacts 2, make contacts 11—3a, resistor 7, conductor 14, and the other blade of switch 1. Practically the entire line voltage appears across resistor 7. During that half of each cycle of the power line voltage when the anode of tube 8 is positive, the lower side of condenser 5 will be at anode potential. Since the grid is practically at cathode potential, a potential difference equal to the peak value of the line voltage is applied to condenser 5, with the grid side of the condenser negative. During that half of each cycle of the power line voltage when the anode of tube 8 is negative, no current flows through the tube, and the charge on condenser 5 is thus maintained constant.

The relay 3 closes contacts 3b in section C and opens contacts 3c in section D.

The section B produces approximately 150 volts positive potential difference between conductors 27 and 28, and approximately 105 volts negative between 27 and 29. These voltages are held nearly constant, despite line voltage fluctuations, by the voltage regulator tubes 23 and 24.

Current will flow through tube 32 when its grid and cathode reach the same potential, whereupon relay 30 becomes energized pulling contact 30a over to 37 and closing contacts 30b in section D. Tube 32 being a hard tube attains operating temperature more slowly than the gas filled tube 8. Contacts 30b close, therefore, only after contacts 3c have opened. Since switch 36 and contacts 3b are closed and effectively short out condenser 35, the closing of contacts 30a and 37 does not produce a charge in condenser 35.

No current flows in the welding circuit D during the warming-up period.

The circuit is now ready for the timing cycle which is started when control switch 2 is opened. This isolates the grid of tube 8 from the cathode. The charge on condenser 5 places a high negative bias on the grid of tube 8, thus stopping the flow of anode current at the beginning of the next positive half-cycle of anode voltage. The relay 3 becomes de-energized, closes contacts 3c and starts the flow of current through the welding transformer circuit. At the same time, contacts 3a and 12 close, and contacts 3b open. The charge on condenser 5 is dissipated through the switch circuit made up of resistor 6, break contacts 3a, 12 and variable resistor 4.

While this happens, condenser 35 in section C begins to charge through resistance 33, and continues to put negative charge on the grid of tube 32. When the anode current sufficiently decreases, the relay 30 lets go its armature, closes contacts 30a and 38, and opens contacts 30b. No current flows through the welding transformer and a cool period starts. When contacts 30a and 38 close, condenser 35 starts to discharge through variable resistor 34, making the grid of tube 32 less negative, and increasing the anode current flowing through relay 30. This anode current increases until it reaches a value high enough to attract the armature of relay 30, whereupon contacts 30b and 30a are again closed and another heat period is started.

Alternate heat and cool periods will continue until condenser 5, in section A, loses sufficient charge to raise the grid potential to the firing voltage of tube 8. When tube 8 fires, relay 3 again energizes, its contacts 3a—11 close, and contacts 3b close. The opening of contacts 3c terminates the welding cycle. The closing of contacts 3a and 11, recharges condenser 5, resetting the timer for the next welding cycle. The closing of contacts 3b, causes the current through relay 30 to increase. Relay 30 attracts its armature, closing contacts 30a—37, which re-sets section C for the next welding cycle. The closing of contacts 30b completes the re-setting of section D.

All the circuits of the timer are now ready for the next welding sequence.

It will be noted that when contact 3a is against contact 12, i. e., during the welding interval, manipulation of control switch 2 has no effect. No additional tube and relay is required for this purpose.

The re-set function follows automatically upon the termination of the welding interval of section A.

Variable resistors 4, 33 and 34, control the length of the welding interval, heat time and cool time, respectively. During a cycle, these time intervals may vary widely. Representative values would be:

Welding interval (extreme limit)—10 to 300 cycles of power line frequency;
Heat time (average)—3 to 60 cycles of power line frequency;
Cool time (average)—3 to 60 cycles of power line frequency.

The sequence timer may be used for a continuously operating "on-off" timing cycle, by moving switch 40 to position a, thus shorting out the normally closed contacts 3c in the primary of the welding transformer circuit. Switch 36 in the grid circuit of tube 32 then serves manually to control the duration of the sequence of heat and cool periods. The sequence is started in the following manner when switch 36 opens: The opening of switch 36 makes the grid voltage of tube 32 independent of the operation of contact 3b but dependent on variable resistance 34 via contacts 38 and 30a. Tube 32 will gradually energize coil 30 which, in turn, interrupts the positive grid bias from resistance 34 while placing through condenser 35 full negative grid bias on the grid of tube 32, thus shutting off the current flow therethrough and de-energizing coil 30. In this way the positive grid bias from resistance 34 is again placed on the grid of tube 32 and the cycle is repeated. Since switch 36 is open and switch 40 is in position a, the entire cycle is independent of the operation of relay 3 and section A. This arrangement is suitable for manually controlling a seam weld by connecting a separate external switch in parallel with switch 36.

A single weld interval instead of a series of heat and cool periods may be produced by moving switch 40 to position c. The flow of welding current will then be controlled only by section A. The length of the interval will depend upon the setting of resistor 4, and will be entirely independent of section C.

Switch 41 is provided manually to control the welding in case of an emergency or in operations not suited to automatic control.

Fig. 2 shows an alternative method of controlling the timing of circuit A. Variable resistor 4 is replaced by a fixed resistor 4. The length of the time interval of section A is, of course, determined by the circuit constants and the voltage to which condenser 5 is charged and this, in turn, by the setting of potentiometer 50 which applies a portion of the line voltage across resistor 7. Fixed resistor 51, in series with potentiometer 50, determines the minimum voltage to which condenser 5 can be charged, and hence the minimum time interval setting for section A. Resistor 51 also insures that the voltage of condenser 5 will not drop below the minimum value required to prevent tube 8 from firing.

Fig. 3 shows a modification in which a relay 100 is added to section A for those applications where a normally open control switch is desirable. Control switch 2 is normally open and its closure causes current to flow through the coil of relay 100. Normally closed relay contacts 100b start the timing of section A by opening when control switch 2 is closed. Control relay 100 will be locked, due to the action of contacts 100a and 3d, until contacts 3d open. Relay 100 then releases and re-sets the timer for the next sequence. Sections B, C and D are the same as in Fig. 1.

Fig. 4 is a modification to allow automatic closing of the welder electrodes with the correct pressure before starting the weld.

When control switch 2 is closed, current flows through the coil of relay 100 which locks through contacts 100a and 3e, when the latter is closed. Through contacts 100b, the relay completes the circuit of solenoid 103, which applies the electrodes to the work at the correct pressure, whereupon switch 102 is closed.

Switch 102 closes the energizing circuit of relay 101 which locks over contacts 101a and 3d, when the latter is closed. The relay contacts 101b open and the welding cycle starts, as described in connection with Fig. 1. Contacts 3d and 3e in the coil circuits of relays 100 and 101, close when the relay 3 is energized and lock relays 100 and 101 until the end of the welding cycle. At the end of the period, the welding transformer circuit is opened by contacts 3c. When contacts 3e open, relay 100 de-energizes, opening contacts 100b and releasing the solenoid 103 which lifts the welding electrodes from the work. The opening of contacts 3d re-sets the timer for the next welding cycle.

It will be seen from the foregoing, that the circuit arranged in accordance with this invention has fewer parts and is simpler than conventional timers, and yet it may be readily adjusted for many purposes. Although in the embodiment shown in Fig. 1 only two relays and two electron discharge tubes (plus the tubes in the rectifier B) are used, by simple switching operations, the circuit may be adapted for use as:

(a) Sequence or pulsation timer for controlling welding operations, such as seam or spot welds;

(b) Interval timer to produce, e. g., a single timed interval for photographic printing or enlarging, in timing any manufacturing process, etc.; and (c) Continuously cycling "on-off" timer with individually controllable on-and-off periods, useful in life-testing resistors, lamps and the like, where a definite "off" time must follow a definite "on" time.

It should be noted that the timing is independent of the initiating or starting switch, once it is actuated. The briefest operation of the switch will start the timing cycle which then continues to its end independently of the switch.

At the completion of the timing cycle, the circuit waits for the next operation of the switch, in the present case its momentary closure and subsequent opening.

No separate timing circuits are required for controlling the "hold" and "re-set" functions. The heat and cool timing functions are performed by a single circuit, but are independently controlled. Each timed interval may be varied by steps of one cycle of the frequency of the power supply lines, and the accuracy of the timing is approximately ±1 cycle.

What is claimed is:

1. In a timing device, a work circuit, means including a gaseous discharge tube and a first relay controlled thereby for determining the total time from a starting time during which current may flow in said work circuit, said relay having a contact in said circuit, means including a second discharge tube and a second relay having a contact in said circuit in series with said last-mentioned contact for determining the time intervals of current flow in said circuit during said total time, a switch for establishing a starting time by placing into operation the circuit of said gaseous discharge tube, the circuit of the gaseous tube including means responsive to a single actuation of said switch for releasing the first relay at the starting time and actuating it at the end of said total time, a contact of said first relay which disables the second tube when the first relay is operated but is ineffective to do so during said total time when it is released, the circuit of the second tube including means for operating the second relay intermittently at a predetermined rate when the second tube is not disabled, and capacitances and resistances in the circuits of said tubes for determining the operating time intervals of said relays.

2. In a timing device, a work circuit, means including a gaseous discharge tube having at least three electrodes and a first relay controlled thereby for determining the total time from a starting time during which current may flow in said work circuit, said relay having a normally closed contact in said circuit, means including a second discharge tube having at least three electrodes and a second relay having a normally open contact in said circuit in series with said normally closed contact for determining the time intervals of current flow in said circuit during said total time, a switch for establishing a starting time by placing into operation the circuit of the first-mentioned tube, the circuit of the gas tube including means responsive to a single actuation of said switch for cutting off the gas tube to de-energize the first relay at the starting time and for ionizing it to actuate said relay at the end of the total time, the last-mentioned means including a variable resistor, a capacitance and a resistance connected with an electrode of the first tube, a contact of the first relay which disables the second tube when the first relay is energized but is ineffective to do so during said total time when it is released, the circuit of the second tube including means for operating the second relay intermittently at a predetermined rate while the second tube is not disabled, the last-mentioned means including a capacitance between the cathode and grid of the second tube variable resistors respectively connectible in parallel and in series with said capacitor by break and make contacts of said second relay.

3. In a timing device, a source of current including an alternating current source and rectifier filter means connected to said alternating current source including means supplying a positive direct current potential and means supplying a negative direct current potential, two discharge devices, each having a cathode, a grid and an anode, connections from the cathodes of both devices to said source, a first relay connected between the anode of the first device and said source, and a second relay connected between the anode of the second device and said means supplying a positive direct current potential, a connection from the grid of the first device to said source, said connection including a first variable resistor, a normally closed contact of the first relay and a resistance, a connection from the grid of the second device to said means supplying a negative direct current potential and including a second variable resistor and a normally closed contact of the second relay, a bridge from the grid of the first device to the cathode thereof, including a condenser, said resistance and a second resistance, a bridge from the grid of the second device to the cathode thereof, including a condenser, a shunt around the last-mentioned condenser, including a manually operable switch and a normally open contact of the first relay, a normally closed switch connected between the two resistances in the first-mentioned bridge and over a normally open contact of the first relay to said source, and a work circuit controlled by a series circuit comprising a normally closed contact of the first and a normally open contact of the second relay.

4. In a timing device, a work circuit, a normally closed contact in said circuit, a relay for controlling said contact, an electrical discharge tube having a cathode, a grid and an anode, a source of current, the relay winding being connected between said anode and said source, and the cathode being connected with said source, a path, from the cathode to the grid including, in series, a resistance and a condenser, a discharge path connectible across said condenser and including a movable contact of said relay and a variable resistor, and a normally closed switch in a connection extending from said source to said movable contact.

5. In a timing device, a work circuit, a normally closed contact in said circuit, a relay for controlling said contact, a condenser shunting the winding of said relay, a gaseous discharge tube having a cathode, a grid and an anode, a source of alternating current, the relay winding being connected between said anode and one side of said source, and the cathode being connected with the other side of said source, a path from the cathode to the grid including, in series, a first and a second resistance and a second condenser, a shunt path extending from a point between said resistances to a movable contact of said relay, a variable resistor connected between said grid and said movable contact when the relay is de-energized, and a normally closed switch connected between said one side of the source and said movable contact when the relay is energized.

6. In a timing device, a work circuit, first timing means for determining the total time during which current may flow in said circuit, second timing means for determining time intervals of current flow in said circuit during said total time, a connection between the first and second means whereby the former starts and stops the operation of the latter, the second means comprising a discharge tube having an anode, a cathode and a grid, a source of positive energizing potential connected to said anode, a source of negative biasing potential, a relay controlled by said tube and having a contact in series in said circuit, a condenser connected between the grid and cathode two variable resistors, and break and make contacts controlled by said relay for alternately connecting said resistors respectively in series between the condenser and the source of negative potential and in parallel with the condenser for charging and discharging it to determine the operating intervals of said relay during said total time.

7. In a timing device, a work circuit, first timing means for determining the total time during which current may flow in said circuit, second timing means for determining time intervals of current flow in said circuit during said total time, a connection between the first and second means whereby the former starts and stops the operation of the latter, the second means comprising a discharge tube having an anode, a cathode and a grid, a relay controlled by said tube and having a normally open contact in series in said circuit, a condenser connected between the grid and cathode, a variable resistor, a discharge path connectible in shunt around said condenser and including said variable resistor and a normally closed contact of said relay, a disabling circuit operated by said connection between the first and second means to connect a low impedance shunt path around said condenser at the end of said total time to stop the operation of the second means, the disabling circuit including a manually operable switch and a contact controlled by said first timing means, a source of D. C. potentials connected with the grid and anode and the cathode of said tube, and a second variable resistor in series in the connection between the grid and said D. C. source, said connection including a normally open contact of said relay.

8. In a timing device, a source of alternating current, a shunt across the said source including a normally open switch and the winding of a relay, a second relay, a condenser shunting the winding of the second relay, a gaseous discharge tube having a cathode, a grid and an anode, a connection from the anode over the winding of the second relay to one side of said source, a connection from the cathode to the other side of said source, a path from the cathode to the grid and including, in series, two resistances and a second condenser, a path from a point between said two resistances to a movable contact of the second relay, a break contact and a make contact individually engageable by the moving contact, a variable resistor connected between the grid and said movable contact over the break contact when the second relay is de-energized, a connection from said one side of said source to said path and including a normally closed contact of the first-mentioned relay and said movable contact and its associated make contact when the second relay is energized, and a shunt around said normally open switch and including normally open contacts of the first and second relays.

9. In a timing device, a source of current, a bridge across said source, including the winding of a first relay and a normally open first switch, a second bridge across said source including the winding of a second relay and a normally open second switch, a third relay, a discharge tube having a cathode, a grid and an anode, a connection from said anode over the winding of the third relay to said source, a connection from the cathode to said source, a resistance and a condenser connected in series between the grid and cathode, a shunt path from a point between said resistance and said condenser to a movable contact of the third relay, a variable resistor connected between the grid and a rest contact associated with said movable contact for connecting the grid to said point when the third relay is de-energized, a connection from said source to a make contact associated with the movable contact of the third relay for connecting the source to said shunt path when the third relay is energized, said last-mentioned connection being over a normally closed contact of the second relay, a shunt around the first switch including normally open contacts of the first and third relays, a shunt around the second switch, including normally open contacts of the second and third relays, a work circuit controlled by a contact of the third relay, and a magnet in said work circuit controlled by a contact of the first relay and controlling, in turn, the second switch.

10. In a timing device for switching electrical power on and off automatically and controllably in a substantially predetermined manner so as to supply electrical current impulses to a welding transformer, a source of alternating current, at least two conductors connected to said source of alternating current, means for rectifying and filtering a portion of said alternating current and for providing positive and negative D. C. potentials, a first timing circuit for controlling periods of time known as weld intervals, said first timing circuit including a gaseous discharge tube having at least an anode, a cathode and a control grid, said cathode being connected to one of said conductors, a first relay, a resistor, said anode being connected to said other conductor through the magnetizing coil of said first relay and through said resistor, a capacitor in shunt with said magnetizing coil of said first relay, said second conductor of said alternating current being connected to ground, first armature-and-contactor switching means which are normally closed but are adapted to be opened by said first relay when it is energized, second resistor having one end electrically connected to said first conductor, a normally closed manually operable starting switch, second armature-and-contactor switching means which are normally opened and which are adapted to be closed by the action of said first relay when it is energized, said second resistor having its other end connected to ground through said starting switch and said second switching means, a third resistor, said third resistor having one of its ends connected to the end of said second resistor which is not connected to said conductor, a capacitor, said capacitor having one of its plates connected to the other end of said third resistor and its other plate connected to said control grid, a variable resistor, said variable resistor being in series with said first armature-and-contactor switching means with the point of connection between said second and said third resistors, and with said control grid, a second timing circuit for controlling periods of time known as heat and cool periods which occur alternately throughout the weld intervals, said second timing circuit including a third conductor connected to said rectifying and filtering means at a point which provides a positive potential, a second relay, a discharge tube having at least the anode, cathode and a control grid, the magnetizing coil of said second relay being connected in series between said third conductor and said anode, said cathode being connected to ground, a fourth conductor connected to said rectifying and filtering means at a point which provides a negative potential, a second variable resistor having one of its ends connected to said fourth conductor and its other end connected to said control grid of said second discharge tube, a second capacitor, said second capacitor being connected between said control grid and ground, third armature-and-contactor switching means normally closed but adapted to be opened when said second relay is energized, said third armature-and-contactor switch means having one of its contacts connected to said grid, a third variable resistor having one of its ends connected to the other contactor of said armature-and-contactor switching means and its other end connected to ground, a manually operated switch which is normally closed, fourth armature-and-contactor switching means normally open but adapted to be closed when said first relay is energized, said manually operated switch and said fourth switching means being connected in series between said control grid and ground, fifth armature-and-contactor switching means normally open but adapted to be closed when said second relay is energized, sixth armature-and-contactor switching means normally closed but adapted to be opened when said first relay is energized, a welding step-down power transformer having a primary and a secondary, a source of electrical energy, connecting means for joining the primary of said power transformer to said source of energy, said fifth and sixth switching means being connected in series with said connecting means for joining the primary of said transformer to said source of energy.

11. A timing device for automatically feeding current impulses to a welding transformer comprising first and second conductors for receiving alternating current from a power line, means connected to the conductors for transforming energy from the line into two direct current potentials which are respectively positive and negative with respect to said second conductor, a first timing circuit for controlling the duration of a weld interval, said circuit including a gaseous discharge tube having an anode, a cathode and a control grid, the cathode being connected to one of said conductors, a first relay over the magnetizing coil of which said anode is connected to said other conductor, a capacitor in shunt with said magnetizing coil, first contacts for said first relay which are normally closed, a first resistor connected on one end to said cathode, a normally closed manual starting switch, second contacts for said first relay which are normally open, a circuit for connecting the other end of said first resistor to said other conductor over the starting switch and said second contacts, a capacitor connected between said other end of the first resistor and said control grid, a first variable resistor and a discharge circuit for connecting it across said last-mentioned capacitor over said first contacts, a second timing circuit for controlling heat and cool periods occurring alternately throughout a weld interval, said second timing circuit including a second discharge tube having an anode, a cathode and a control grid, a second relay over the magnetizing coil of which the anode of the second tube is connected to the positive direct current output of said transforming means, the cathode of the second tube being connected to said second conductor, a second variable resistor having one of its ends connected to the negative direct current output of said transforming means and its other end connected to the control grid of the second tube, a third capacitor connected between the control grid and cathode of the second tube, first contacts for said second relay which are normally closed for interconnecting said last-mentioned grid and cathode over a third variable resistor, third contacts for the first relay which are normally opened and a second normally closed manual switch arranged in series for connecting the control grid of the second tube to said second conductor at the end of a weld interval, a welding transformer, second contacts for the second relay which are normally open arranged in series with fourth contacts for the first relay which are normally closed for connecting the primary of said transformer between said conductors for each heat period occurring during a weld interval.

JACOB KURTZ.
JAMES D. WALDIE.

REFERENCES CITED

The following references are of record in the file of this patent:

UNITED STATES PATENTS

| Number | Name | Date |
|---|---|---|
| 2,024,542 | Simon | Dec. 17, 1935 |
| 2,120,565 | Lord | June 14, 1938 |
| 2,157,858 | Miller | May 9, 1939 |
| 2,231,695 | Uedder | Feb. 11, 1941 |
| 2,232,541 | Levoy | Feb. 18, 1941 |
| 2,277,146 | Roby | Mar. 24, 1942 |
| 2,289,320 | Collom | July 7, 1942 |
| 2,295,601 | Overbeck | Sept. 15, 1942 |
| 2,297,740 | Brown | Oct. 6, 1942 |
| 2,333,363 | Callom | Nov. 2, 1943 |
| 2,339,750 | Bartholy | Jan. 25, 1944 |
| 2,373,545 | Cooper | Apr. 10, 1945 |
| 2,412,092 | Mayle | Dec. 3, 1946 |
| 2,415,396 | Undy | Feb. 4, 1947 |